(12) United States Patent
Yamamori

(10) Patent No.: US 7,653,373 B2
(45) Date of Patent: Jan. 26, 2010

(54) COMMUNICATION TERMINAL, FIXED-LINE PHONE, AND COMPUTER READABLE MEDIUM

(75) Inventor: Osamu Yamamori, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 487 days.

(21) Appl. No.: 11/701,630

(22) Filed: Feb. 2, 2007

(65) Prior Publication Data
US 2007/0184829 A1    Aug. 9, 2007

(30) Foreign Application Priority Data
Feb. 3, 2006  (JP) ............... 2006-027072

(51) Int. Cl.
H04M 3/42  (2006.01)
(52) U.S. Cl. ............. 455/403; 455/415; 455/556.2; 379/142.02; 379/201.11
(58) Field of Classification Search ......... 455/415, 455/556.1–558; 379/142.02–142.06, 201.11
See application file for complete search history.

(56) References Cited

U.S. PATENT DOCUMENTS

| | | | | |
|---|---|---|---|---|
| 5,724,408 | A * | 3/1998 | Morganstein | 379/88.2 |
| 6,584,188 | B2 * | 6/2003 | Kim | 379/211.02 |
| 7,127,237 | B2 * | 10/2006 | Naruse et al. | 455/415 |
| 7,197,300 | B2 * | 3/2007 | Kushita | 455/418 |
| 7,200,211 | B1 * | 4/2007 | Lemke | 379/142.06 |
| 7,260,197 | B2 * | 8/2007 | Smith | 379/142.06 |
| 2003/0050054 | A1 * | 3/2003 | Siu | 455/418 |
| 2003/0220099 | A1 | 11/2003 | Hama | |
| 2007/0201651 | A1 * | 8/2007 | Bontempi | 379/142.02 |

FOREIGN PATENT DOCUMENTS

| | | |
|---|---|---|
| EP | 0 843 489 A1 | 5/1998 |
| EP | 1 330 105 A2 | 7/2003 |
| JP | H09-046371 | 2/1997 |
| JP | 2003-125066 | 4/2003 |
| JP | 2003-298723 A | 10/2003 |

(Continued)

OTHER PUBLICATIONS

"Notice of Caller ID Function" Deutsche Telekom K.K., Apr. 2006.

(Continued)

*Primary Examiner*—Simon D Nguyen
(74) *Attorney, Agent, or Firm*—Brinks Hofer Gilson & Lione

(57) ABSTRACT

A communication terminal includes a communication interface configured to exchange data via a communication network, a memory, a first table stored in the memory and configured to store identifiers of communication terminals which are senders of received data, a second table stored in the memory and configured to store identifiers of communication terminals designated by a user, a user interface configured to receive an input of an identifier of a communication terminal with which a communication is to be initiated, and a processor configured to determine whether the identifier of the communication terminal input via the user interface is stored in the first table, determine whether the input identifier of the communication terminal is stored in the second table, and if a result of the determination is affirmative, instruct the communication network not to notify an identifier of its own terminal to the communication terminal.

9 Claims, 4 Drawing Sheets

FOREIGN PATENT DOCUMENTS

| | | |
|---|---|---|
| JP | 2004-048344 | 2/2004 |
| JP | 2004-056323 | 2/2004 |
| JP | 2004-056324 | 2/2004 |
| JP | 2004-112418 | 4/2004 |
| JP | 2004-120243 | 4/2004 |
| JP | 2004-134903 | 4/2004 |
| JP | 2004-135124 | 4/2004 |
| WO | WO 00/48409 | 8/2000 |

OTHER PUBLICATIONS

EPO Search Report issued May 9, 2007 in EPO patent application No. 07002321.3.

EP Office Action issued Feb. 22, 2008 in EPO patent application No. 07002321.3.

Office Action for Japanese Application No. 2006-027072, dated Sep. 1, 2009, 8 pages (with translation).

* cited by examiner

| NAME | TELEPHONE NUMBER |
|---|---|
| TARO YAMADA | 090-1111-1111 |
| KEN TANAKA | 090-1111-1112 |
| HANAKO YOSHIDA | 090-1111-1113 |
| ····· | ····· |
| ⋮ | ⋮ |

| RECEIVED DATE AND TIME | TELEPHONE NUMBER |
|---|---|
| 2005/10/1/10:00 | 090-1111-1111 |
| 2005/10/1/12:15 | 090-1111-3333 |
| 2005/10/1/14:23 | 03-9999-9999 |
| ····· | ····· |
| ⋮ | ⋮ |

COMMUNICATION TERMINAL, FIXED-LINE PHONE, AND COMPUTER READABLE MEDIUM

This application claims priority under 35 U.S.C. §119 to Japanese Patent Application No. JP 2006-027072 filed Feb. 3, 2006, the entire content of which is hereby incorporated by reference.

BACKGROUND OF THE INVENTION

1. Field of the Invention

The present invention relates to a method for reducing damage caused by one-ring scam phone calls to a communication terminal.

2. Description of the Related Art

In recent years, a caller ID function, which notifies a telephone number (a caller ID) of a calling side to a called side, has been provided in a common telephone. A called side telephone provided with the caller ID function displays a notified caller ID on a display, and stores the caller ID in a call registry. Accordingly, a user of the telephone is able to know who the calling side is on the basis of a displayed caller ID, without answering the phone. Also, a user is able to call back later using a telephone number stored in a call registry, if s/he cannot take a call.

Recently, however, there have been many cases of a caller ID function being abused by people who make one-ring scam phone calls (scammers), who most commonly target mobile phones. A one-ring scam phone call is an act of leaving a caller ID in a call registry of a called side and thereby leading a user of the called side to respond to an unintended pay-service.

Specifically, a scammer calls a mobile phone and hangs up immediately after one ring, thereby leaving the caller's telephone number in a call registry of the mobile phone, without being answered by a called side. If the user of the mobile phone calls back using the telephone number in the call registry, s/he is connected to an unintended pay-service. In the case of a mobile phone especially, the call back function is readily used as it is not only convenient but also necessary because a user may often not be able to answer a call, for example, while driving, or during a meeting. Therefore, mobile phone users would call back a telephone number stored in a call registry carelessly or unwittingly, and thereby become an easy target of one-ring scam phone calls.

Countermeasures to a one-ring scam phone call have been proposed by six Japanese unexamined patent publications: JP 2003-125066; JP 2004-048344; JP 2004-056324; JP 2004-120243; JP 2004-135124; and JP 2004-134903 which is to not store a caller ID of a phone call in a call registry that is not registered in a phonebook of a called mobile phone. This countermeasure is based on a belief that a call from a telephone not registered in a phonebook of a called mobile phone is likely to be a one-ring scam phone call, and by not storing a caller ID of such a call, a user would be prevented from calling back an unintended pay-service.

In contrast to the countermeasure, an aspect of the present invention proposes a method for preventing a one-ring scam phone call from being repeated. Specifically, an aspect of the present invention proposes a method of, when replying to, possibly a one-ring scam phone call, preventing a caller ID of a user from being notified to the scammer. This method is effective in preventing a one-ring scam phone call from being repeated, because if a caller ID is not notified to a scammer, s/he is not able to know for a fact whether a particular caller ID is actually being used.

Usually, a scammer causes a computer to generate caller IDs at random and dial the caller IDs without knowledge of whether the caller IDs are actually in use. However, once a scam-call is replied to with a user' caller ID attached, the scammer comes to know that the caller ID is in use and can repeatedly use the caller ID for scam phone calls. For this reason, preventing a scammer from knowing that a caller ID is in use can be a countermeasure to repeated one-ring scam phone calls.

The problem addressed by the present invention applies also to an email. As in the case of a phone call, a reply mail to a scammer with an email address attached may lead to a situation where a user is bombarded with unsolicited mails.

SUMMARY OF THE INVENTION

To address the above problem, an aspect of the present invention provides a communication terminal including a communication interface configured to exchange data via a communication network, a memory, a first table stored in the memory and configured to store identifiers of communication terminals which are senders of data received by the communication interface, a second table stored in the memory and configured to store identifiers of communication terminals designated by a user, a user interface configured to receive an input of an identifier of a communication terminal with which a communication is to be initiated, and a processor coupled with the communication interface, the memory, and the user interface, and configured to, determine whether the identifier of the communication terminal input via the user interface is stored in the first table, determine whether the input identifier of the communication terminal is stored in the second table, and if the input identifier of the communication terminal is stored in the first table and not stored in the second table, instruct the communication network not to notify an identifier of its own terminal to the communication terminal.

BRIEF DESCRIPTION OF THE DRAWINGS

Exemplary embodiments of the present invention will be described in detail with reference to the following figures, wherein.

DETAILED DESCRIPTION OF THE PREFERRED EMBODIMENTS

(1) First Embodiment

Figure 1:
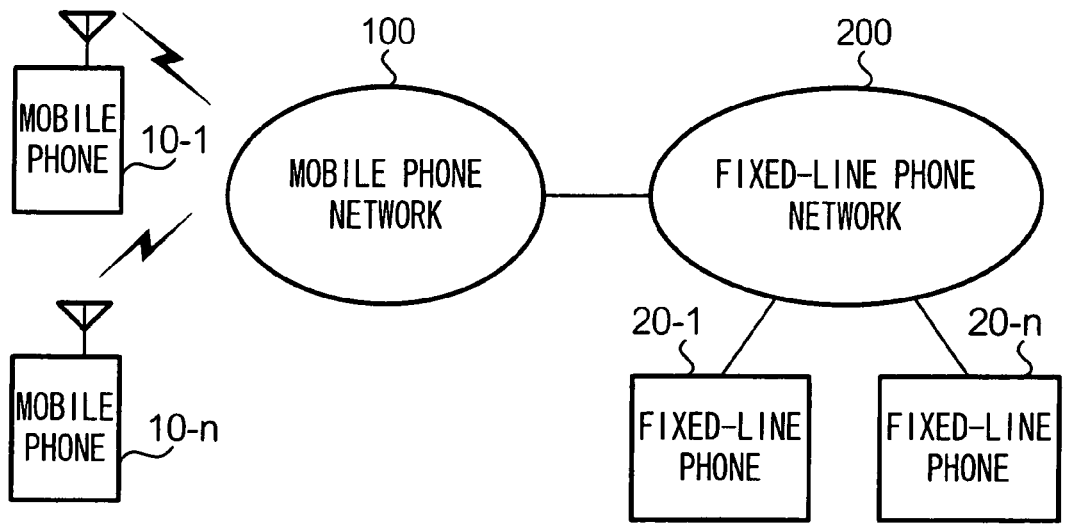
FIG. 1 is a block diagram illustrating a configuration of a communication system according to a first embodiment of the present invention.

FIG. 1 is a block diagram illustrating a configuration of a communication system according to the present embodiment.

In the drawing, mobile phone network 100 may be a network of PDC (Personal Digital Cellular), GSM (Global System for Communications), or IMT-2000 (International Mobile Telecommunication-2000), and comprise plural base stations and switch centers. Each base station forms a wireless communication area, or cell, and communicates with mobile phones 10-1 to 10-n located in the wireless communication area via a wireless channel assigned to the mobile phone.

Fixed-line phone network 200 may be a PSTN (Public Switched Telephone Network). The network is accessed by plural fixed-line phones 20-1 to 20-n. The network is also accessed by mobile phone network 100 via a POI (Point of Interface) which is not shown.

Each of mobile phones 10-1 to 10-n and fixed-line phones 20-1 to 20-n have a telephone number assigned and communication can take place between a mobile phone and a fixed-line phone; between mobile phones; or between fixed-lined phones.

It should be noted that in the following description mobile phones 10-1 to 10-n are each referred to as mobile phone 10, and fixed-line phones 20-1 to 20-n are each referred to as fixed-line phone 20, except where it is necessary to specify otherwise.

Figure 2:
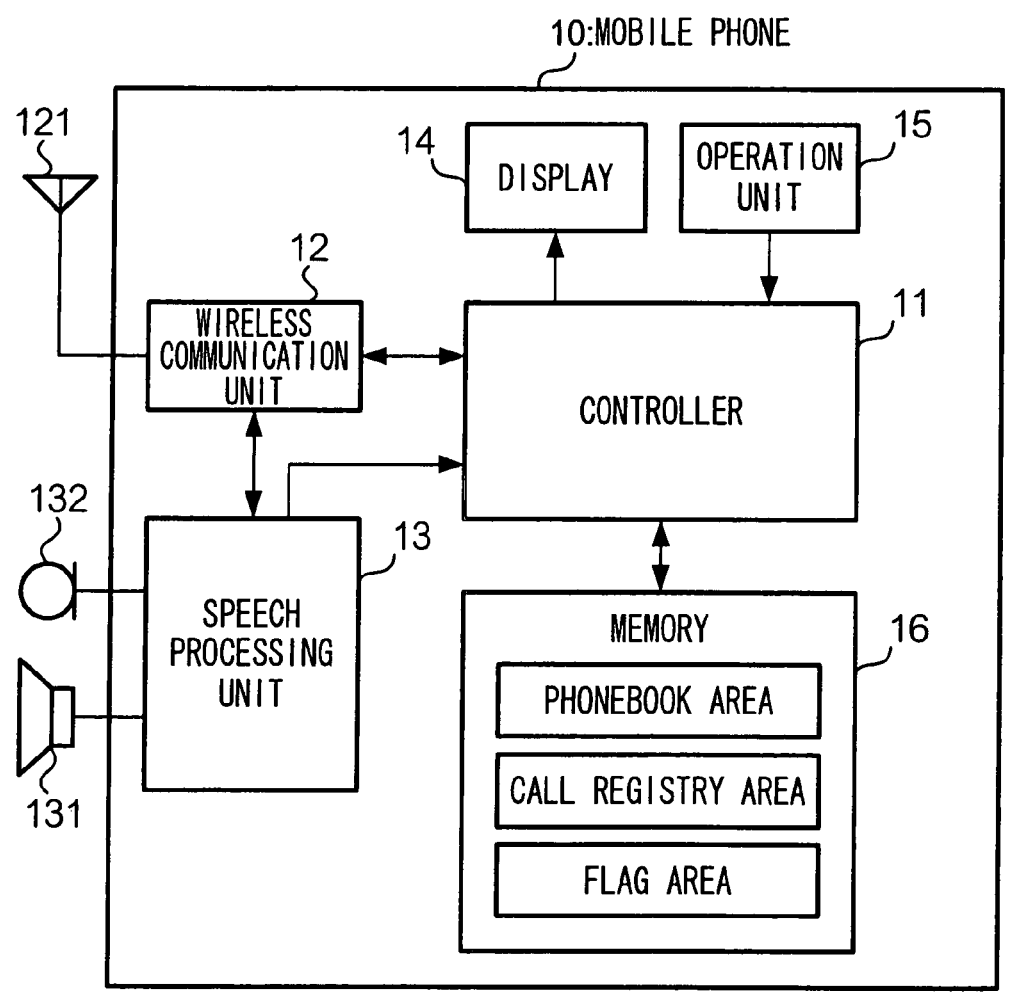
FIG. 2 is a block diagram illustrating a configuration of a mobile phone according to the first embodiment.

FIG. 2 is a block diagram illustrating a configuration of mobile phone 10.

As shown in the drawing, mobile phone 10 comprises: controller 11; wireless communication unit 12; speech processing unit 13; display 14; operation unit 15; and memory 16. Controller 16 may be a CPU, and control components of mobile phone 10. Wireless communication unit 12 comprises antenna 121 and a wireless communication circuit (not shown). Wireless communication unit 12, when receiving a wireless signal from a base station of mobile communication network 100, demodulates the signal by a frequency conversion or A/D conversion, and also makes an error correction on the signal. The resultant voice data is provided to speech processing unit 13 to be subject to a D/A conversion and amplification, and converted into sound in speaker 131. The voice data is also provided to controller 11. On the other hand, voice emitted by a user of mobile phone 10 is collected by microphone 132 and converted into a voice signal, and is further converted into digital data after amplification and an A/D conversion. The digital data is subject to an echo cancellation, and an error correcting code is attached to it, and further subject to a modulation and a frequency conversion. After that, the digital data is sent from antenna 121 to a base station as a wireless signal.

Display 14 comprises a liquid crystal display and a driving circuit for the liquid crystal display, and displays a variety of images such as a dialogue box. Operation unit 15 comprises a numeric keypad and keys such as an on-hook key and an off-hook key, and provides a signal to controller 11 according to an operation of a user.

Figures 3, 4, 5:
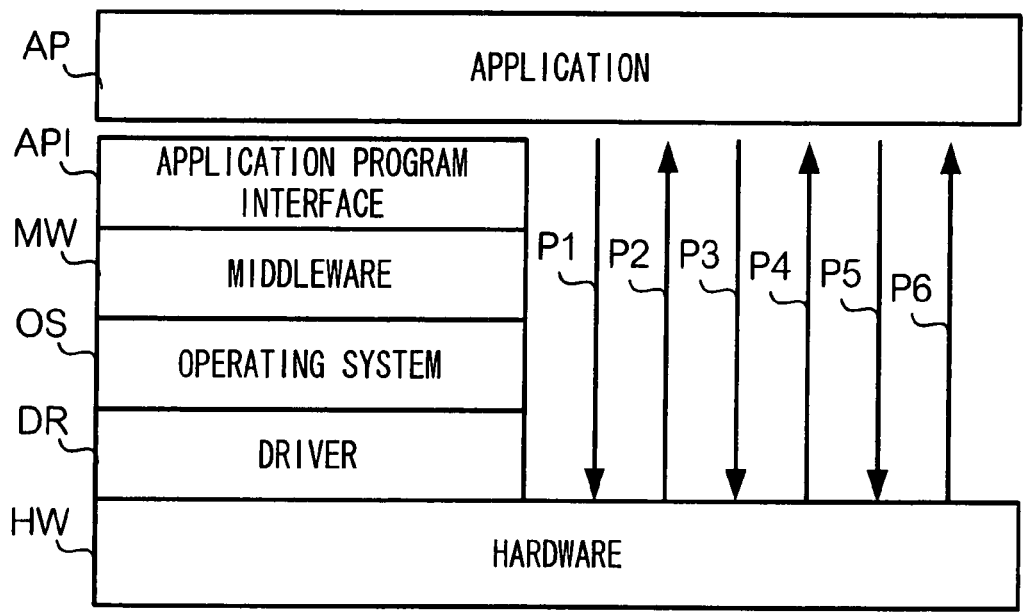
FIG. 3 is a diagram illustrating contents of a phonebook stored in the mobile phone.
FIG. 4 is a diagram illustrating contents of a call registry stored in the mobile phone.
FIG. 5 is a diagram illustrating an architecture of the mobile phone.

Memory 16 may be an EEPROM (Electrically Erasable and Programmable Read Only Memory) or a flash memory, and stores computer programs, which are a series of actions executed by controller 11 in a particular order, and stores necessary data for the actions. Memory 16 has an area for storing a list of user identifiers of telephones (mobile phone 10 or fixed-line phone 20) and corresponding telephone numbers. Since the list is usually called a "phonebook", the area for storing the list is referred to as "phonebook area". FIG. 3 shows an example of contents stored in the phonebook area. The drawing shows that a telephone number "090-1111-1111" is assigned to a telephone of a user named "Taro Yamada".

Memory 16 also has a call registry area where a telephone number included in a received call setup signal is registered with the received date and time. FIG. 4 shows an example of contents stored in the call registry area. FIG. 4 shows that a call is received from a telephone having a telephone number "03-9999-9999" on Oct. 1, 2005, 14:23.

Returning to the explanation of FIG. 2, memory 16 also has a flag area where a flag, which indicates whether a caller ID function is enabled or disabled, is stored. If the value of a flag is "1", or a flag is on, a caller ID function is enabled. On the other hand, if the value of a flag is "0", or a flag is off, a caller ID function is disabled. A user can set a caller ID function by means of operation unit 15, and the setting is stored in the flag area as a value of a flag.

If a caller ID function is enabled, controller 11 instructs, when a call is originated, via wireless communication unit 12, mobile phone network 100 to notify a telephone number of mobile phone 10 to a called telephone. A switching center of mobile phone network 100, according to the instruction, sends a call setup signal including the telephone number to the destination telephone. Consequently, the telephone number of mobile phone 10 is notified to the called telephone as a caller ID. On the other hand, if a caller ID function is disabled, controller 11 instructs, when a call is originated, via wireless communication unit 12, mobile phone network 100 not to notify a telephone number of mobile phone 10 to a called telephone. A switching center of mobile phone network 100, according to the instruction, sends a call setup signal not including the telephone number to the destination telephone. Consequently, the telephone number of mobile phone 10 is not notified to the called telephone.

Now, FIG. 5 is a diagram illustrating a configuration of hardware and software of mobile phone 10 hierarchically. As shown in the drawing, mobile phone 10 comprises, from the bottom layer to the upper layer, hardware HW; driver DR for controlling hardware HW; operating system OS for managing overall the functions of hardware HW such as input/output or storage; middleware MW that works on operating system OS and provides more specific functions than those of operating system OS; application program interface API that is a collection of instructions and functions; and application AP.

Figure 6:
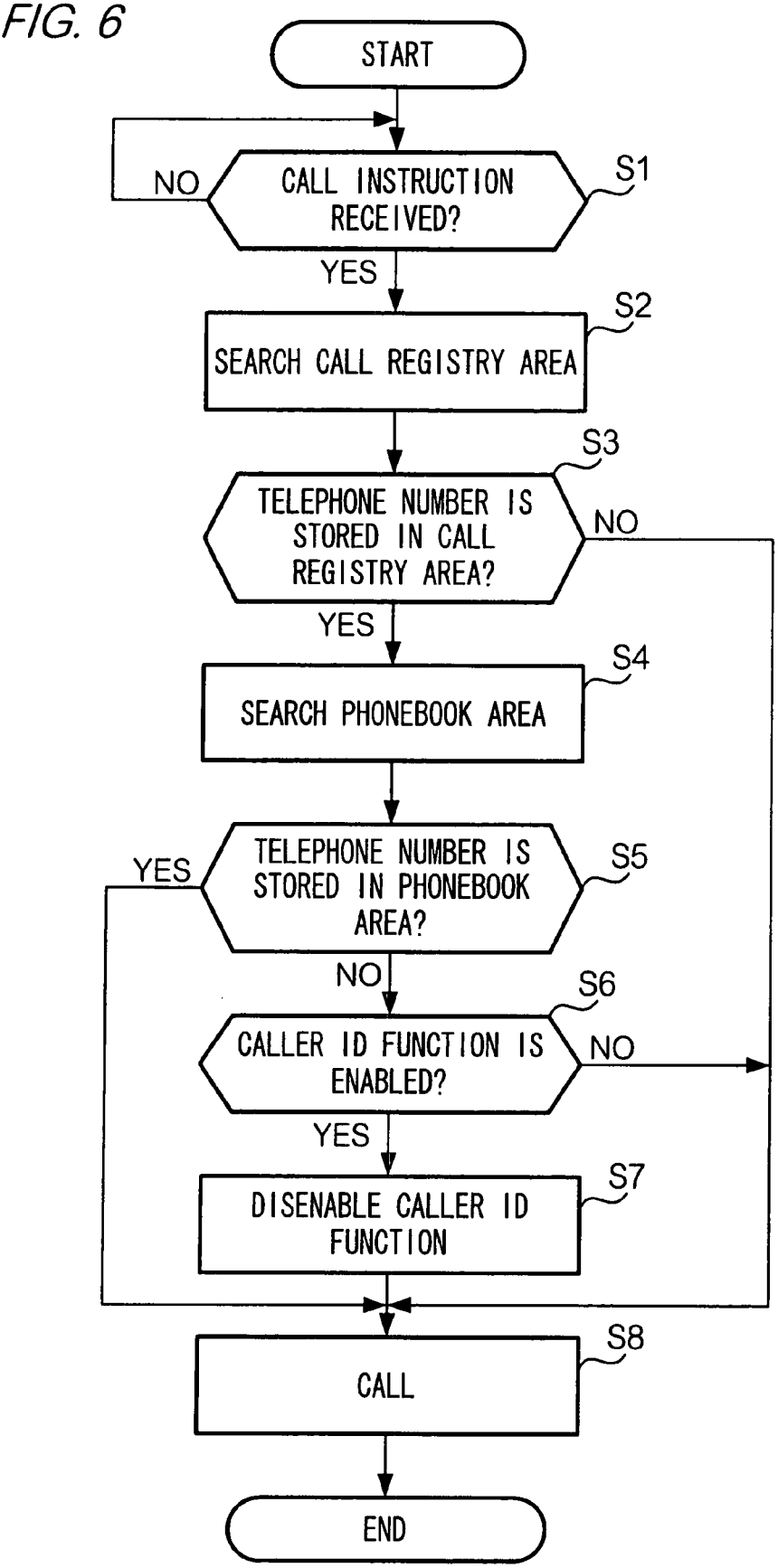
FIG. 6 is a flowchart of an operation carried out by the mobile phone.

Now, an operation of mobile phone 10 will be described with reference to the diagram of FIG. 5 and a flowchart of FIG. 6. An exemplary case described below is a case where mobile phone 10-1 calls fixed-line phone 20-1 using a caller ID of fixed-line phone 20-1. In this case, it is assumed that mobile phone 10-1 has received a call from fixed-line phone 20-1, and stores a caller ID of fixed-line phone 20-1 in a call registry. Also, contents of a phonebook and a call registry stored in memory 16 of mobile phone 10-1 are assumed to be those of FIGS. 3 and 4. Further, a telephone number of mobile phone 10-1 is assumed to be "090-5555-5555", and a telephone number of fixed-line phone 20-1 is assumed to be "03-9999-9999".

A user of mobile phone 10-1, by means of operation unit 15, selects a telephone number and carries out an operation to call a telephone to which the telephone number is assigned. Specifically, the user selects a telephone number "03-9999-9999" registered in a call registry, and pushes an off-hook key of operation unit 15, to make mobile phone 10-1 call a destination telephone. When receiving the instruction via operation unit 15 (step S1; YES), controller 11 searches the call registry area of memory 16 for the telephone number "03-9999-9999" (step S2), and determines whether the telephone number is stored in the call registry area (step S3).

The operations of steps S1 to S3 correspond to an operation of arrow P1 in FIG. 5 where application AP for originating a call sends an inquiry to hardware HW (memory 16) to confirm whether the telephone number "03-9999-9999" is registered in the call registry area, and an operation of arrow P2 where hardware HW sends an ANSER to application AP. If the value of the ANSER is "1", it means that the telephone number "03-9999-9999" is stored in the call registry area, and on the other hand, if the value is "0", it means that the telephone number is not stored.

As a result of the determination of step S3, if the telephone number "03-9999-9999" is stored in the call registry area as shown in FIG. 4 (step S3; YES), controller 11 proceeds to an operation of step S4. On the other hand, if the telephone number "03-9999-9999" is determined as not to be stored in the call registry area (step S3; NO), controller 11 proceeds to a call origination (step S8). This is because a telephone number not stored in the call registry area is unlikely to be a telephone number for a one-ring scam phone call.

At step S4, controller 11 searches a phonebook area of memory 16 for the telephone number "03-9999-9999", and determines whether the telephone number is stored in the phonebook area (step S5).

The operations of steps S4 and S5 correspond to an operation of arrow P3 of FIG. 5 where application AP for originating a call sends an inquiry to hardware HW (memory 16) to confirm whether the telephone number "03-9999-9999" is stored in the phonebook area, and an operation of arrow P4 where hardware HW sends an ANSER to application AP. If the value of the ANSER is "1", it means that the telephone number "03-9999-9999" is stored in the phonebook area, and on the other hand, if the value is "0", it means that the telephone number is not stored.

As a result of the determination of step S5, if the telephone number "03-9999-9999" is not stored in the phonebook area as shown in FIG. 3 (step S5; NO), controller 11 determines on the basis of a flag stored in a flag area of memory 16 whether a caller ID function is enabled (step S6). If the flag stored in the flag area is on, controller 11 determines that a caller ID function is enabled (step S6; YES). In this case, controller 11 changes the setting of the flag from on to off to disable a caller ID function (step S7).

The operations of steps S4 and S5 correspond to an operation of arrow P5 of FIG. 5 where application AP for originating a call instructs hardware HW (wireless communication unit 12) to disable a caller ID function, and an operation of arrow P6 that hardware HW notifies application AP that a caller ID function has been disabled.

Subsequently, controller 11 proceeds to a call origination, and causes wireless communication unit 12 to send a call setup signal including the telephone number "03-9999-9999" to a base station (step S8). When doing so, since a caller ID function is disabled, controller 11 instructs mobile phone network 100 not to notify a telephone number "090-5555-5555" of mobile phone 10-1 to the called telephone. A switching center of mobile phone network 100, according to the instruction, does not include the telephone number of mobile phone 10-1 in a call setup signal for calling fixed-line phone 20-1 having the telephone number "03-9999-9999". Accordingly, the telephone number of mobile phone 10-1 does not become known to a user of fixed-line phone 20-1.

As a result of the determination of step S5, if the telephone number "03-9999-9999" is stored in the phonebook area (step S5; YES), controller 11 proceeds to a call origination (step S8). This is because a telephone number stored in the phonebook area is unlikely to be a telephone number for a one-ring scam phone call.

As a result of the determination of step S6, if a caller ID function is disabled (step S6; NO), controller 11 proceeds to a call origination (step S8). In this case, since a caller ID function is disabled, controller 11 instructs mobile phone network 100 not to notify a telephone number of mobile phone 10-1 to a called telephone. Accordingly, the telephone number of mobile phone 10-1 does not become known to a user of fixed-line phone 20-1, as in the above case.

To reiterate, according to the present embodiment, if a telephone number designated by a user is stored in a call registry area, and not stored in a phonebook area, a controller of a mobile phone disables a caller ID function so that a telephone number of the mobile phone is not to be notified to a called telephone. Accordingly, the user can avoid a situation where his/her mobile phone gets repeated one-ring scam phone calls.

(2) Second Embodiment

The present embodiment is characterized by displaying a selection screen on display 14 where a user can select whether to disable a caller ID function, when a telephone number designated by a user is stored in a call registry area, and not stored in a phonebook area.

A configuration of the present embodiment is the same as that of the first embodiment which is shown in FIGS. 1 and 2. Therefore, an explanation of the configuration will be omitted.

Figure 7:
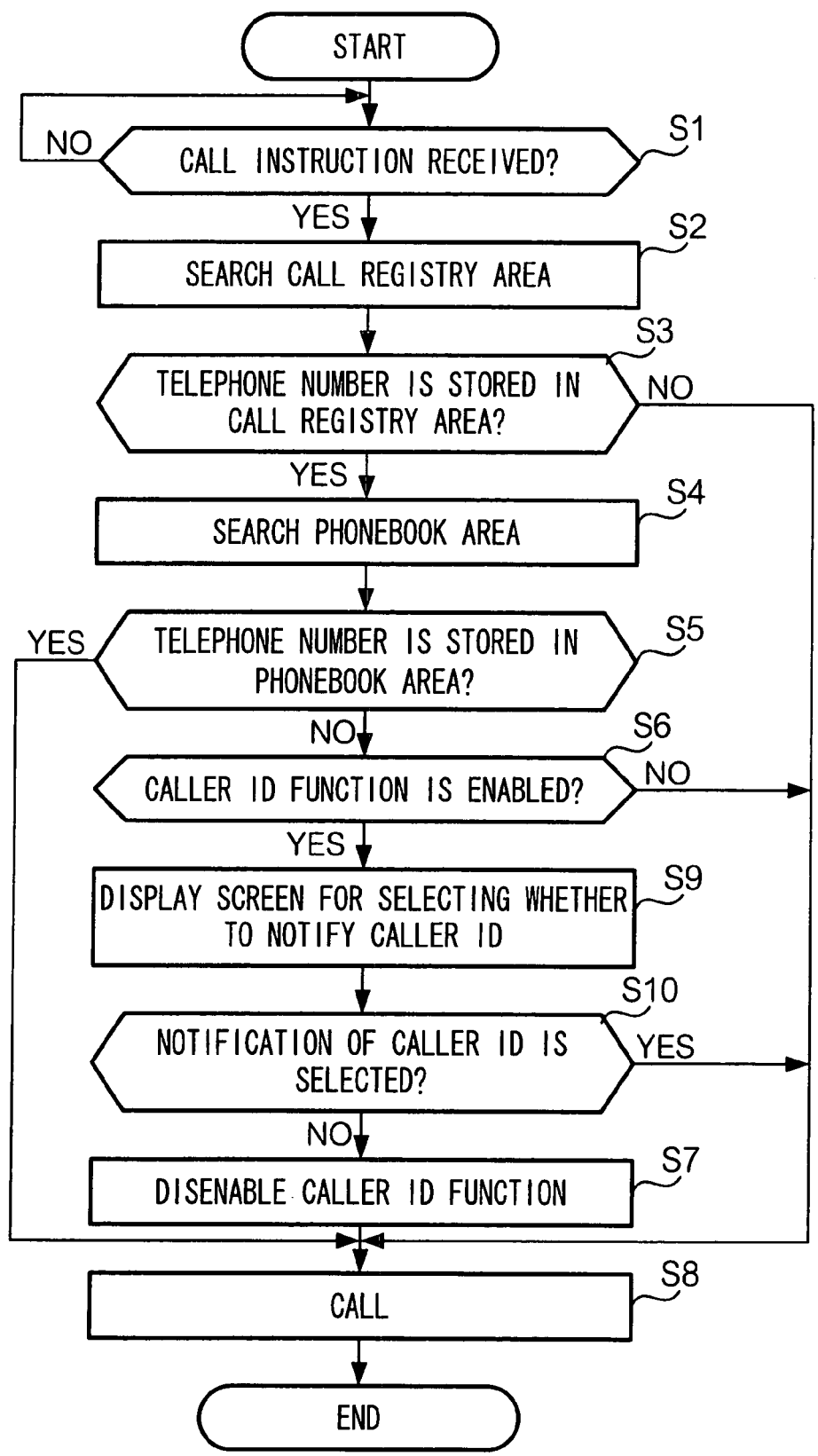
FIG. 7 is a flowchart of an operation carried out by a mobile phone according to a second embodiment of the present invention.

An operation of the present embodiment will be described with reference to FIG. 7. FIG. 7 is a flowchart illustrating an operation carried out by controller 11 of mobile phone 10-1 according to the present embodiment. The flowchart of FIG. 7 is different from that of FIG. 6 in that steps S9 and S10 are inserted between steps S6 and S7. Namely, in the present embodiment, if a caller ID function is determined as being enabled (step S6; YES), a selection screen where a user can select whether to notify a caller ID to a destination displayed on display 14 by controller 11 (step S9). If the user selects not to notify a caller ID, and this operation is received by controller 11 via operation unit 15 (step S10; NO), controller 11 disables a caller ID function. As a result, at step S8, controller 11 instructs mobile phone network 100 not to notify a telephone number "090-5555-5555" of mobile phone 10-1 to a called telephone. Accordingly, the telephone number of mobile phone 10-1 does not become known to a user of fixed-line phone 20-1.

On the other hand, if the user selects to notify a caller ID, and this operation is received by controller 11 via operation unit 15 (step S10; YES), controller 11 instructs, when a call is originated, by means of wireless communication unit 12, mobile phone network 100 to notify a telephone number of the mobile phone to a called telephone. A switching center of mobile phone network 100, according to the instruction, sends a call setup signal including the telephone number of mobile phone 10 to the destination telephone. Consequently, the telephone number of mobile phone 10 is notified to the called telephone as a caller ID.

(3) Modifications (3-1) Modification 1

As described in the section of Related Art, while a normal call lets a phone ring long enough for a user to answer the phone, a one-ring scam phone call terminates after only one ring. Given this fact, it is considered that it is possible to determine whether a call is a one-ring scam phone call on the basis of the duration of a ring.

Specifically, controller 11 of mobile phone 10 measures a time between the receipt of a call setup signal and the receipt of a call disconnection signal which are sent from a base station, and determines whether the measured time is shorter than a threshold time. If the measured time is shorter than the threshold time, and further, if a telephone number designated by a user is stored in a call registry area and not stored in a phonebook area, controller 11 determines the call as being a one-ring scam phone call, and disables a caller ID function.

(3-2) Modification 2

In the first and second embodiments, a PHS (Personal Handyphone System®), a PDA (Personal Digital Assistant), or a fixed-line phone may be used as mobile phone 10. Mobile phone 10 may be any terminal as long as it has a number for calling such as a telephone number.

(3-3) Modification 3

In the first embodiment, in addition to a history of received calls, a history of placed calls may be considered to determine whether to enable a call ID function.

Specifically, controller 11 of mobile phone 10 determines whether a telephone number designated by a user is stored as a telephone number of a placed call, in addition to whether the telephone number is stored in a call registry area and a phonebook area. As a result, if the telephone number is stored as a telephone number of a placed call, even if the telephone number is stored in a call registry area and not stored in a phonebook area, controller 11 enables a caller ID function. By the configuration, even in a case where a telephone number is not registered in a phonebook (some users do not register telephone numbers in a phonebook and make a call using a telephone number recorded as a received call), a caller ID function can be used.

Alternatively, when a telephone number designated by a user is stored as a telephone number of a placed call, controller 11 may adhere to a default setting of the caller ID function, instead of forcibly disabling a caller ID function. Namely, if a caller ID function is enabled at the time of the determination, controller 11 decides to use a caller ID function, and if a caller ID function is disabled at the time of the determination, controller 11 decides not to use a caller ID function.

(3-4) Modification 4

A computer program executed by controller 11 in the first and second embodiments may be provided in a recording medium such as a magnetic tape, magnetic disk, floppy disk®, optical recording medium, optical magnetic recording medium, CD (Compact Disk), DVD (Digital Versatile Disk), or RAM. Alternatively, the computer program may be provided via a mobile phone network or the Internet.

(3-5) Modification 5

The present invention may be applied to not only a telephone, but also to an email terminal. When the invention is applied to an email terminal, the terminal may comprise the following units:
  a) a communication unit which communicates with a communication network for email exchange;
  b) an email address list memory which stores email addresses of email terminals which can be connected to the communication network and identification names of users of the email terminals in association with each other;
  c) a received email history memory which stores email addresses of emails received by the communication unit from the communication network;
  d) an operation unit which receives an operation from a user of designating an email address and instructing the sending of an email to an email terminal having the email address; and
  e) a controller which if the designated email address is stored in the received email history memory, and not stored in the email address list memory, does not notify an email address of its own terminal to the email terminal having the email address.

A detailed operation of the email terminal is as follows.

A user of the email terminal creates an email addressed to a destination email terminal by means of an operation unit. When the operation by the user is received by a controller, the controller searches a received mail history area of a memory to determine whether an email address of the destination email terminal is stored in the received mail history area. As a result of the determination, if the email address is not stored in the received mail history area, the controller proceeds to an operation of sending the email. On the other hand, if the email address is stored in the received mail history area, the controller searches an email address list area (area for storing a list of email addresses and corresponding user names) of the memory to determine whether the email address is stored in the email address list area. As a result of the determination, if the email address is not stored in the email address list area, the controller fills a dummy email address in a source address field of the email. Alternatively, the controller may fill a blank in the source address field. After that, the controller sends the mail to the destination email terminal.

According to the email terminal, if an email address designated via an operation unit is stored in a received email history memory, and not stored in an email address list memory, an email address of the email terminal is not notified to a destination email terminal. Accordingly, if a user unwittingly replies to an unsolicited mail transmitted randomly, the user is protected from repeated transmission of unsolicited mails.

The present invention, which is explained in the foregoing description as two different devices of a mobile phone and an email terminal, may be expressed in broad terms as a communication terminal including:
  a) a communication unit which communicates with a communication network;
  b) a first memory which stores identifiers of communication terminals connectable to the communication network and identification names of users of the communication terminals in association with each other;
  c) a second memory which stores identifiers of communication terminals which are sources of data received by the communication unit from the communication network;
  d) an operation unit which receives an operation from a user designating an identifier and instructing the initiation of a communication with a communication terminal having the identifier; and
  e) a controller which if the designated identifier is stored in the second memory, and not stored in the first memory, does not notify an identifier of its own terminal to the communication terminal having the designated identifier.

In the description, "a communication with a communication terminal" is a verbal communication between phones or an exchange of emails between email terminals.

Also, the present invention may be applied to a mobile phone which is connectable to a WWW server, and is capable of filling in a user agent field of the header of an HTTP (Hypertext Transfer Protocol) message, an identifier of hardware or software of the mobile phone, which is used by the WWW server to provide content to the mobile phone according to the performance of the hardware or software. When the present invention is applied to such a mobile phone, the mobile phone may comprise the following units:

a) a communication unit which communicates with a communication network for an HTTP message;
b) a list memory which stores network addresses of servers connectable to the communication network and identification names of the servers in association with each other;
d) an operation unit which receives an operation from a user of designating a network address and instructing the sending of an HTTP message to a server having the network address; and
e) a controller which if the designated identifier is not stored in the list memory, does not notify an identifier of hardware or software of its own terminal to the server having the designated network address.

In the description, "network addresses of servers" are URLs (Uniform Resource Locators) or IP (Internet Protocol) addresses. A "list memory" is a memory storing a list of names of servers (or WWW sites) and corresponding URLs like "favorites". An operation of "not notify[ing] an identifier of hardware or software of its own terminal to [a] server" is, specifically, an operation of filling a blank in a user agent field of the header of an HTTP message, or an operation of filling a dummy identifier in the user agent field.

What is claimed is:

1. A communication terminal comprising:
a communication interface configured to exchange data via a communication network;
a memory;
a first table stored in the memory and configured to store identifiers of communication terminals which are senders of data received by the communication interface;
a second table stored in the memory and configured to store identifiers of communication terminals designated by a user;
a user interface configured to receive an input of an identifier of a communication terminal with which a communication is to be initiated; and
a processor coupled with the communication interface, the memory, and the user interface, and configured to:
determine whether the identifier of the communication terminal input via the user interface is stored in the first table;
determine whether the input identifier of the communication terminal is stored in the second table; and
if the input identifier of the communication terminal is stored in the first table and not stored in the second table, instruct the communication network not to notify an identifier of its own terminal to the communication terminal.

2. The communication terminal according to claim 1, further comprising a display, wherein:
the processor is further configured to cause the display to display a selection screen where a user can select, by means of the user interface, whether to notify an identifier of its own terminal to the communication terminal; and
the processor is configured to, if the input identifier of the communication terminal is stored in the first table and not stored in the second table, and further an instruction from a user is input via the user interface not to notify an identifier of its own terminal to the communication terminal, instruct the communication network not to notify an identifier of its own terminal to the communication terminal.

3. The communication terminal according to claim 1, wherein:
the processor is further configured to measure a time between a receipt of a communication setup signal and a receipt of a communication disconnection signal;
the processor is further configured to determine whether the measured time is shorter than a threshold time; and
the processor is configured to, if the input identifier of the communication terminal is stored in the first table and not stored in the second table, and further the measured time is determined to being shorter than the threshold time, instruct the communication network not to notify an identifier of its own terminal to the communication terminal.

4. The communication terminal according to claim 1, further comprising a third table stored in the memory and configured to store identifiers of communication terminals to which data has been sent by the communication interface, wherein the processor is configured to, if the input identifier of the communication terminal is stored in the third table, even if the identifier of the communication terminal is stored in the first table and not stored in the second table, instruct the communication network to notify an identifier of its own terminal to the communication terminal.

5. The communication terminal according to claim 1, further comprising:
a third table stored in the memory and configured to store identifiers of communication terminals to which data has been sent by the communication interface; and
a fourth table stored in the memory and configured to store a setting of a caller ID function, wherein the processor is configured to, if the input identifier of the communication terminal is stored in the first table and not stored in the second table, and further the identifier of the communication terminal is stored in the third table, determines on a basis of the setting stored in the fourth table whether to instruct the communication network to notify an identifier of its own terminal to the communication terminal.

6. The communication terminal according to claim 1, wherein the communication interface exchanges data wirelessly.

7. A telephone comprising: a communication interface configured to exchange a call via a telephone network; a memory; a call registry stored in the memory and configured to store telephone numbers included in call setup signals received by the communication interface; a phonebook stored in the memory and configured to store telephone numbers designated by a user; a user interface configured to receive an input of a telephone number of a telephone to which a call is to be originated; and a processor coupled with the communication interface, the memory, and the user interface, and configured to: determine whether the telephone number of the telephone input via the user interface is stored in the call registry; determine whether the input telephone number of the telephone is stored in the phonebook; and if the input telephone number of the telephone is stored in the call registry and not stored in the phonebook, instruct the telephone network not to notify a telephone number of its own terminal to the telephone.

8. A computer readable medium storing a program for causing a computer to execute a process for communication, the computer comprising:
a communication interface configured to exchange data via a communication network;
a memory;

a first table stored in the memory and configured to store identifiers of communication terminals which are senders of data received by the communication interface;

a second table stored in the memory and configured to store identifiers of communication terminals designated by a user; and a user interface configured to receive an input of an identifier of a communication terminal with which a communication is to be initiated;

the process comprising:

determining whether the identifier of the communication terminal input via the user interface is stored in the first table;

determining whether the input identifier of the communication terminal is stored in the second table; and if the input identifier of the communication terminal is stored in the first table and not stored in the second table, instructing the communication network not to notify an identifier of its own terminal to the communication terminal.

9. A computer readable medium storing a program for causing a computer to execute a process for communication, the computer comprising: a communication interface configured to exchange a call via a telephone network; a memory; a call registry stored in the memory and configured to store telephone numbers included in call setup signals received by the communication interface; a phonebook stored in the memory and configured to store telephone numbers designated by a user; and a user interface configured to receive an input of a telephone number of a telephone to which a call is to be originated, the process comprising: determining whether the telephone number of the telephone input via the user interface is stored in the call registry; determining whether the input telephone number of the telephone is stored in the phonebook; and if the input the telephone number of the telephone is stored in the call registry and not stored in the phonebook, instructing the telephone network not to notify a telephone number of its own terminal to the telephone.

* * * * *